US011336951B2

(12) United States Patent
Klenner et al.

(10) Patent No.: US 11,336,951 B2
(45) Date of Patent: *May 17, 2022

(54) CLIENT, SERVER, RECEPTION METHOD AND TRANSMISSION METHOD COMPLIED TO MOVING PICTURE EXPERTS GROUP-DYNAMIC ADAPTIVE STREAMING OVER HTTP STANDARD

(71) Applicant: Panasonic Intellectual Property Corporation of America, Torrance, CA (US)

(72) Inventors: Peter Klenner, Frankfurt (DE); Frank Herrmann, Frankfurt (DE); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/158,151

(22) Filed: Jan. 26, 2021

(65) Prior Publication Data

US 2021/0152874 A1 May 20, 2021

Related U.S. Application Data

(63) Continuation of application No. 16/073,553, filed as application No. PCT/JP2017/003094 on Jan. 30, 2017, now Pat. No. 10,951,944.

(Continued)

(30) Foreign Application Priority Data

Nov. 24, 2016 (JP) .............................. JP2016-228396

(51) Int. Cl.
*G06F 3/00* (2006.01)
*G06F 13/00* (2006.01)

(Continued)

(52) U.S. Cl.
CPC ......... *H04N 21/438* (2013.01); *H04N 21/238* (2013.01); *H04N 21/23805* (2013.01)

(58) Field of Classification Search
CPC ............... H04N 21/438; H04N 21/238; H04N 21/23805
See application file for complete search history.

(56) References Cited

U.S. PATENT DOCUMENTS

2016/0028646 A1* 1/2016 Fablet ..................... H04L 47/78
709/226
2016/0182600 A1* 6/2016 Swaminathan .... H04N 21/2393
709/217

(Continued)

FOREIGN PATENT DOCUMENTS

WO 2015/004276 1/2015

OTHER PUBLICATIONS

International Search Report (ISR) dated Apr. 25, 2017 in International (PCT) Application No. PCT/JP2017/003094.

(Continued)

*Primary Examiner* — Gigi L Dubasky
(74) *Attorney, Agent, or Firm* — Wenderoth, Lind & Ponack, L.L.P.

(57) ABSTRACT

A client receives streaming data according to Moving Picture Experts Group-Dynamic Adaptive Streaming over HTTP (MPEG-DASH) standard. The client includes a transmitter which transmits a Media Presentation Description (MPD) request or a segment request to a server, and a receiver which receives an MPD specified in the MPD request and a segment specified in the segment request. The MPD request contains information requesting transmission of an initialization segment by a push. The receiver receives the initialization segment transmitted by the push.

2 Claims, 11 Drawing Sheets

Related U.S. Application Data

(60) Provisional application No. 62/295,790, filed on Feb. 16, 2016, provisional application No. 62/289,469, filed on Feb. 1, 2016.

(51) Int. Cl.
*H04N 5/445* (2011.01)
*H04N 21/438* (2011.01)
*H04N 21/238* (2011.01)

(56) References Cited

U.S. PATENT DOCUMENTS

| | | | |
|---|---|---|---|
| 2016/0198012 A1* | 7/2016 | Fablet | H04N 21/47202 709/231 |
| 2017/0006081 A1* | 1/2017 | Grandl | H04L 65/80 |
| 2017/0238040 A1* | 8/2017 | Huysegems | H04L 67/02 725/116 |

OTHER PUBLICATIONS

Information technology—Dynamic adaptive streaming over HTTP (DASH)—Part 1: Media presentation description and segment formats, International Standard, ISO/IEC 23009-1:2014(E), May 15, 2014.

* cited by examiner

FIG. 2

| 0-3 | 4-7 | 8-15 | 16-31 |
|---|---|---|---|
| \multicolumn{3}{c}{Source Port} | | | Destination Port |
| Sequence Number | | | |
| Acknowledgement Number | | | |
| Offset | Reserved | Flags | Window |
| CRC | | | Urgent Pointer |
| Options | | | |
| Data | | | |

FIG. 3

| TIME | SOURCE | DESTINATION | PROTOCOL |
|---|---|---|---|
| 35 1.763164 | 10.100.226.... | 129.132.85.... | TCP |
| 36 1.775480 | 129.132.85.... | 10.100.226.... | TCP |
| 37 1.776101 | 10.100.226.... | 129.132.85.... | TCP |
| 38 1.778418 | 10.100.226.... | 129.132.85.... | HTTP |

LENGTH   INFO
66 57372 → 80 [SYN] Seq = 935915421 Win = 64512 Len=0 MSS:
66 80 → 57372 [SYN, ACK] Seq = 4136727030 Ack = 935915422
54 57372 → 80 [ACK] Seq = 935915422 Ack = 4136727031 Win =
162 GET /data/cina0_text.zip HTTP/1.1

CLIENT, SERVER, RECEPTION METHOD AND TRANSMISSION METHOD COMPLIED TO MOVING PICTURE EXPERTS GROUP-DYNAMIC ADAPTIVE STREAMING OVER HTTP STANDARD

TECHNICAL FIELD

The present disclosure relates to clients which receive streaming of multimedia content on networks having varying bandwidths using a MPEG-DASH format, servers which transmit the streaming, client reception methods, and server transmission methods.

BACKGROUND ART

NPL 1 discloses Moving Picture Experts Group-Dynamic Adaptive Streaming over HTTP (MPEG-DASH) or standard specification of adaptive streaming techniques according to Hypertext Transfer Protocol (HTTP). A DASH server provides content data corresponding to a plurality of representations having different image qualities and different bit rates, as a file corresponding to time-divided units, i.e., segments, or subsegments of divided segments. The segments or subsegments are units divided in unit of several seconds. The file corresponding to the segments or subsegments is an MP4 file containing pictures or sounds. The file corresponding to the segments or subsegments can be obtained, for example, by specifying an URL address according to HTTP. A DASH client can request a file corresponding to the segments or subsegments having quality (so-called representation) suitable for the current network state and the current throughput, based on a manifest file (so-called Media Presentation Description (MPD)) where the configuration of the entire content or part thereof and the specification of the start segment are described.

CITATION LIST

Non Patent Literature

NPL 1; Information technology—Dynamic adaptive streaming over HTTP (DASH)—Part 1; Media presentation description and segment formats, INTERNATIONAL STANDARD, ISO/IEC 23009-1; 2014(E)

SUMMARY OF THE INVENTION

Technical Problem

Unfortunately, the techniques disclosed in NPL 1 cannot reduce the amount of processing performed in the client and the server.

Solutions to Problem

The client according to one aspect of the present disclosure is a client which receives streaming data according to Moving Picture Experts Group-Dynamic Adaptive Streaming over HTTP (MPEG-DASH) standard. The client includes a transmitter which transmits a Media Presentation Description (MPD) request or a segment request to a server; and a receiver which receives an MPD specified in the MPD request and a segment specified in the segment request. The MPD request contains information requesting transmission of an initialization segment by a push, and the receiver receives the initialization segment transmitted by the push.

The server according to one aspect of the present disclosure is a server which transmits streaming data according to MPEG-DASH standard. The server includes a receiver which receives an MPD request or a segment request from a client; and a transmitter which transmits, by a push, an MPD specified in the MPD request and a segment specified in the segment request to the client, the MPD request and the segment request being received by the receiver. The MPD request contains information requesting transmission of an initialization segment by a push, and the transmitter transmits the initialization segment by the push.

The overall or specific aspects may be implemented by a system, a method, an integrated circuit, a computer program, or a recording medium such as a computer-readable CD-ROM, or may be implemented by any combination of systems, methods, integrated circuits, computer programs, and recording media.

Advantageous Effect of Invention

According to these aspects, the amount of processing performed in the client and the server can be reduced.

BRIEF DESCRIPTION OF DRAWINGS

FIG. 2 is a diagram illustrating a configuration of a TCP header.
FIG. 3 is a diagram illustrating an excerpt from a Wireshark (registered trademark) session.

DESCRIPTION OF EXEMPLARY EMBODIMENTS

Figure 1:
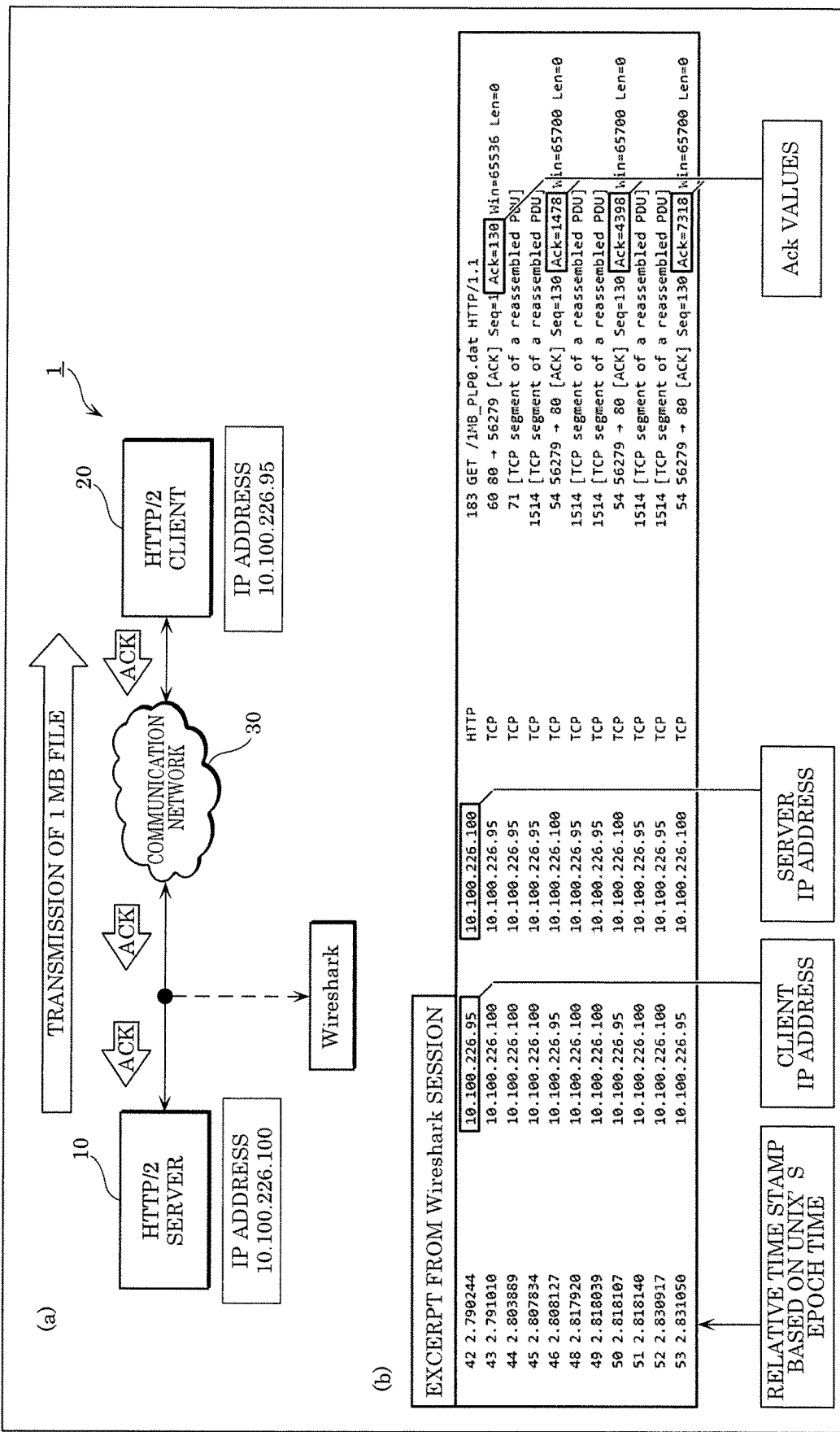
FIG. 1 is a diagram for illustrating a communication system according to Embodiment 2.

The client according to one aspect of the present disclosure is a client which receives streaming data according to Moving Picture Experts Group-Dynamic Adaptive Streaming over HTTP (MPEG-DASH) standard. The client includes a transmitter which transmits a Media Presentation Description (MPD) request or a segment request to a server, and a receiver which receives an MPD specified in the MPD request and a segment specified in the segment request. The MPD request contains information requesting transmission of an initialization segment by a push, and the receiver receives the initialization segment transmitted by the push.

The server according to one aspect of the present disclosure is a server which transmits streaming data according to the MPEG-DASH standard. The sever includes a receiver which receives an MPD request or a segment request from a client, and a transmitter which transmits, by a push, an MPD specified in the MPD request and a segment specified in the segment request to the client, the MPD request and the segment request having been received by the receiver. The MPD request includes information requesting transmission of an initialization segment by the push, and the transmitter transmits the initialization segment by the push.

The overall or specific aspects may be implemented by a system, a method, an integrated circuit, a computer program, or a recording medium such as a computer-readable CD-ROM, or may be implemented by any combination of systems, methods, integrated circuits, computer programs, and recording media.

The client, server, reception method, and transmission method according to one aspect of the present disclosure will now be specifically described below with reference to the drawings.

The embodiments to be described below only show specific examples of the present disclosure. Numeral values, shapes, materials, components, arrangements, positions, and connection forms of the components, steps, order of the steps, and the like shown in the embodiments below are only examples, and will not limit the present disclosure. Among the components in the embodiments below, components not described in independent claims expressing the highest concept will be described as arbitrary components.

Embodiment 1

1-1. Background

MPEG-DASH specifies an URL-addressable format for ISO-BMFF formatted media segments, and a manifest file is called Media Presentation Description (MPD). DASH was originally conceived to deal with transport of media over networks (for example, unmanaged Internet connections (OTT)) with variable throughput. The MPEG-DASH system was based on a client-centric technical idea, which was to leverage already available technology. Accordingly, the existing HTTP-webserver and a DASH-enabled client can realize a dynamic streaming session.

The initial concept was expanded in scope by MPEG. New concepts were introduced into Server-And-Network-Assisted-DASH (SAND), Content-Aggregation-and-Playback Control (CAPCO), and Full-Duplex-HTTP (FDH), for example. The latter, FDH, leverages the recently ratified HTTP/2 standard, and enables the server to push data onto a client, the data having not been requested by the client itself. A benefit of defined related push directives is mainly a reduction in overhead. For every pushed segment, the corresponding HTTP request from the client can be dispensed with, thereby saving the bandwidth.

The FDH part of DASH is currently being specified in ISO/IEC 23009 Part 6, and to this date includes four strategies for pushing content from the server to the client. These strategies are called "push directives", each of which is composed of a push type and an accompanying push parameter. The push type includes push-next, push-none, push-template, and push-time, for example.

Push-next and push parameter K indicate that the next K segments are considered for push using the segment requested as the initial index.

Push-none indicates that no push occurs. In this case, no parameter is used.

Push-template indicates that some segments described by an URI template are considered for push. The push parameter is referred to as URI template.

Push-time indicates that beginning with the requested segment, segments are considered for push until the specified segment time exceeds time T. Time T is signaled as a push parameter.

Push-next and push-time indicate that the server can select to indefinitely push when their push parameters are set at 0. Although this is already contained in the gist of the present disclosure, it does not cause the server to perform the control beyond the selection of the representation or to act on bit rate fluctuations.

1-2. Typical DASH-FDH Session

The client first requests an MPD with a push directive, and then requests media segments. After receiving the requested MPD, the client starts requesting media segments from the server using the respective DASH segment URLs and push directives. The server then replies with the requested media segments. The operation is followed by the push cycles as indicated by the push strategy. After receiving a minimum amount of data, the client starts playing back the media. The process repeats until the media streaming session is completed.

To prepare a client for the next media segments, the server may transmit the MPD, and also preliminarily transmit an initialization segment by a push at the same time. The initialization segment is information containing the header information of a segment.

A benefit of the push directive is a reduction in overhead. All of the push directives still require the client to request new segments either when the number of the requested segments is provided (push-next) or when the segment time is exceeded (push-time). A new push directive according to one aspect of the present disclosure will now be described, which enables the server to automatically select and push the segments over the course of the total media duration. Thereby, the overhead caused by the segment requests is reduced to a minimum. The new push directive enables the server to determine the application of unicast and/or multicast mode for all or part of the connections to the client. The server may automatically determine only the parameters related to the network bandwidth between the server and a receiving terminal, such as the bit rate and the resolution of the segment.

1-3. Estimation of Client-Side Throughput in Server

Part of the present disclosure is a method for estimating a throughput experienced by a client in a server, based on acknowledgement numbers contained in the acknowledgement packets transmitted from the client to the server during a TCP/IP connection. These acknowledgement packets are an integral part of the TCP layer; therefore, no additional overhead is created or necessary to use the method. This throughput estimation method with the push directive "automatic" reduces the total overhead to a minimum while retaining the DASH philosophy of switching representations based on the current throughput.

DASH is based on the ubiquitous HTTP-protocol. HTTP in turns relies on the underlying TCP/IP layer to transport requests, responses, and data. The TCP/IP layer splits a data stream into packets, and ensures their reliable transport. To this process, the HTTP layer is completely oblivious. The packetization process and the reassembly process are enabled by two fields contained in the TCP header, i.e., a sequence number and an acknowledgement number.

The sequence number and the acknowledgement number are generated at both end-points during the initialization phase of the TCP connection (three-way handshake). Both numbers are used for the packetization and the packet reassembly process. These numbers are initially two random 32-bit integers, and are exchanged between the server and the client.

The sequence number is increased by the server by the number of bytes which are currently being transmitted. Thereby, the relative sequence number between packets serves as a pointer to the starting position of the current packet in the total data byte stream.

More importantly, the acknowledgement number is transmitted from the client to the server to notify the number of successfully received bytes of the server. Accordingly, the server having an external timer measuring the arrival time of the acknowledgement packets can readily estimate the throughput currently experienced by the client.

1-4. Advantageous Effects

As already described above, the system according to the present disclosure can reduce the overhead because metric messages and segment requests are unnecessary. The system according to the present disclosure can also centralize control over switching between the unicast mode and the multicast mode. The system according to the present disclosure also enables a server to centrally manage its resources. In other words, while monitoring the throughput, the server anticipates a throughput bottleneck, and smoothly reduces the transmitted bit rate, thereby avoiding unintended highly dynamic changes of representations. HTTP/2-enabled clients do not need to track traffic diagnostics. The elimination of tracking of the traffic diagnostics can result in power saving and cost saving at the same time.

Furthermore, typically, the server provides data to multiple clients. Using a mechanism of the push directive "automatic" and the throughput estimation, the server can select to switch from the unicast mode to a more effective multicast mode when multiple clients request the same content at the same time (e.g., in conjunction with live TV transmission). Depending on the channel condition, for example, the unicast mode or the multicast mode can be assigned to all or part of the multiple clients.

In particular, in the cases of communication within specific areas such as event sites, it is possible to preliminarily estimate the rate and the segments themselves to be highly possibly selected, based on another information, such as the number of visitors and information unique to the communication terminals within the areas. In such cases, the determination and selection in the server are simplified, enabling ideal distribution with a small amount of delay.

1-5. Outline of the Present Disclosure

New DASH push directive "automatic"
DASH push parameter/strategy indicators: The client needs to announce its capabilities before the server provides media segments indefinitely.
Throughput estimation method based on the acknowledgement number of TCP
Combination of the existing DASH push directives (push-next, push-time, and push-template) with the claimed new DASH push directive "automatic"
Example: The server automatically pushes the next K segments, and then receives a new push request for automatically pushing the next L segments.
Automatic and dynamic selection (based on the values measured in the throughput measurement) of the unicast mode or the multicast mode for all or part of the clients requesting the same content at the same time

1-5-1. Detail 1

A new DASH push directive enables a server to select and push data to a client as seen fit by the server. This push directive will now be referred to as push directive "automatic".

1-5-2. Detail 2

A DASH push parameter which accompanies the push directive will be described. The server is notified about the capabilities of the clients. The client is, for example, an apparatus which can process available media decoders, reproducible image resolutions, and frame-rates. In an embodiment, as shown in Tables 1-1 and 1-2, the push parameter may be represented by a composite data type having a field extracted from a receiver capability table (RCT). The present embodiment should not be construed as limitative. For example, the present embodiment should not be limited by any format of the receiver capability table having a function identical with the communication with the server about the capabilities of the client.

TABLE 1-1

| Parameter | Type | Description |
| --- | --- | --- |
| bufferSize | unsignedInt | specifies the client's available memory (size in bytes) for storing DASH segments. |
| minBandwidth | unsignedInt | specifies the minimum @bandwidth value in all Representations in this Adaptation Set. This value has the same units as those of the @bandwidth attribute. If not present, the value is unknown. |
| maxBandwidth | unsignedInt | specifies the maximum @bandwidth value in all Representations in this Adaptation Set. This value has the same units as those of the @bandwidth attribute. If not present, the value is unknown. |

TABLE 1-1-continued

| Parameter | Type | Description |
|---|---|---|
| minWidth | unsignedInt | specifies the minimum @width value the client can reproduce. This value has the same units as those of the @width attribute. If not present, the value is unknown. |
| maxWidth | unsignedInt | specifies the maximum @width value the client can reproduce. This value has the same units as those of the @width attribute. If not present, the value is unknown. |
| minHeight | unsignedInt | specifies the minimum @height value the client can reproduce. This value has the same units as those of the @height attribute. If not present, the value is unknown. |
| maxHeight | unsignedInt | specifies the maximum @height value the client can reproduce. This value has the same units as those of the @height attribute. If not present, the value is unknown. |
| minFrameRate | FrameRateType | specifies the minimum @framerate value the client can reproduce. This value is encoded in the same format as the @frameRate attribute. If not present, the value is unknown. |
| maxFrameRate | FrameRateType | specifies the maximum @framerate value the client can reproduce. This value is encoded in the same format as the @frameRate attribute. If not present, the value is unknown. |

TABLE 1-2

| Parameter | Type | Description |
|---|---|---|
| bandwidth | unsignedInt | preferred bit rate at which the client expects to have enough data for continuous playout. This considers a hypothetical constant bit rate channel of bandwidth with the value of this attribute in bits per second (bps). Then, if the Representation is continuously delivered at this bit rate, starting at any SAP that is indicated either by @startWithSAP or by any Segment Index box, a client can be assured of having enough data for continuous playout providing playout beings after @minBufferTime bits have been received (i.e., at time @ minBufferTime after the first bit is received). For dependent Representations, this value specifies the bandwidth according to the above definition for the aggregation of this Representation and all complementary Representations. |
| width | unsignedInt | specifies the preferred horizontal visual presentation size of the video media type on a grid based on a sample aspect ratio of "1-1". |
| height | unsignedInt | specifies the preferred vertical visual presentation size of the video media type on a grid based on a sample aspect ratio of "1-1". |
| frameRate | FrameRateType | specifies the preferred output frame rate (or in the case of interlaced, half the output field rate) of the video media type in the Representation. If the frame or field rate is varying, the value is the average frame rate or half the average field rate over the entire duration of the Representation. The value is coded as a string, either containing two integers separated by a "/", |

TABLE 1-2-continued

| Parameter | Type | Description |
| --- | --- | --- |
| | | ("F/D"), or a single integer F. The frame rate is the division F/D, or F, respectively, per second (i.e., the default value of D is "1"). If not present on any level, the value is unknown. |
| codecs | String | specifies the process of codecs processable at the client. The codec parameters shall include the applicable profile and level information. This element shall be present and the contents of this attribute shall conform to either the simp-list or fancy-list productions of RFC6381, Section 3.2, without the enclosing DQUOTE characters. The codec identifier for the Representation's media format, mapped into the name space for codecs as specified in RFC6381, Section 3.2, shall be used. |
| modeIndicator | unsignedInt | specifies an indicator flag as per Table 2 to guide the server in its segment selection process. |

The parameter "modeIndicator" guides the server during selection of the actual parameter. Its suitable mode is maximum quality, minimum quality, and a low dynamic mode in switching of the representations, for example. These are shown in Table 2. Other modes are also possible. It should be understood that any other modes can be used in the present disclosure.

TABLE 2

| modeindicator (unsignedInt) | Mode | Description |
| --- | --- | --- |
| 0 | Maximum quality | The server is asked to deliver segments corresponding to the best available quality. |
| 1 | Lowest quality | The server is asked to deliver segments corresponding to the lowest available quality. |
| 2 | Low dynamic in switching representations | The server is asked to switch representation only to the next lowest or nest lowest quality level. |

1-5-3. Detail 3

Another combination of DASH push directives contains a push directive "automatic" or "push-automatic-rate". In one embodiment of the present disclosure, a suitable push directive combined with the push directive "automatic" may be push-next, push-time, and push-template. It should be understood that any other combination can be used.

For example, by specifying, using push-next, such that the next N segments are received, and by specifying push-automatic-rate, the server automatically selects the bit rate of the N segments. Alternatively, push-automatic-rate may be effective until it is invalidated by a push directive separately specified, i.e., push-channel-automatic-rate. At this time, unless push-channel-automatic-rate is issued, push-automatic-rate is still effective to the segments transmitted after the transmission of the N segments.

When the server receives push-none during the transmission of the segments even after push-full-automatic has already been specified, the server stops the transmission of the segments immediately or after transmitting the final data of the segment being currently transmitted.

1-5-4. Detail 4

The estimation method and the estimation apparatus estimate the throughput of the client based on the acknowledgement number in the TCP header transmitted from the client to the server, by measuring the arrival time of the acknowledgement packets with an external timer.

A relative acknowledgement number as the difference between the current acknowledgement number and the initial acknowledgement number is denoted. Similarly, a relative time as the difference between the arrival time of the current acknowledgement packets and the arrival time of the acknowledgement packets is denoted. A first method for estimating throughput is to calculate the quotient of the relative acknowledgement number and the relative time.

The difference in acknowledgement number is denoted as a difference between the last acknowledgement packet and the penultimate acknowledgement packet. Similarly, the difference in arrival time is denoted as a difference between the arrival time of the last acknowledgement packet and that of the penultimate acknowledgement packet. A second method for estimating throughput is to calculate the average of the consecutive quotients of differential acknowledgement numbers and differential times by a suitable digital filter.

1-5-5. Detail 5

Automatic and dynamic selection is performed (in the extreme case segment-by-segment). In the automatic and dynamic selection, based on the aforementioned throughput measurement methods (representing the quality of the connection to each single client), the unicast mode or multicast mode is selected for all or part of the clients requesting the same content at the same time.

Embodiment 2

2-1. Background

DASH's philosophy builds on clients measuring throughput and requesting segments based on those measurements. Recently, HTTP/2 introduced a new push-feature with which the server can transmit data to a client unsolicited. In Part 6 of the DASH standard, MPEG wants to leverage this new HTTP/2 feature for DASH. Part 6 is called FDH. Although four push directives already exist (push-next, push-none, push-template, and push-time), these are still largely driven by the client.

As described in Embodiment 1, the throughput to the client can be measured on the server side. In other words, the server can manage the client by using this new push directive "automatic".

Selection of segments is partially or completely controlled by the server based on a push directive. In other words, the numbers or duration to transmit the segments and their bit rate are determined by the server.

2-2. Setup of Measurement

FIG. 1 is a diagram for illustrating a communication system according to Embodiment 2. (a) of FIG. 1 is a block diagram illustrating one example of the configuration of the communication system; (b) of FIG. 1 is a diagram for illustrating a communication situation in the communication system.

As illustrated in (a) of FIG. 1, communication system 1 includes server 10, and client 20 connected to server 10 via communication network 30 to communicate with server 10.

Server 10 is an HTTP/2 server. Server 10 runs dummynet for custom traffic shaping. Server 10 runs software for analyzing the situations and protocols of packets when obtained (such as Wireshark (registered trademark)) to capture all the packets into pcap-file (further processed in Python having the scapy package). Here, pcap (packet capture) indicates an application programming interface (API) for a packet sniffer (packet analyzer) in the field of the management of computer networks. In Unix (registered trademark) system, pcap is packaged as libpcap.

Server 10 transmits a 1-MB file with Pseudo-Random Bit Sequence (PRBS). Dummynet is used for traffic shaping, in particular, for controlling the transmission bandwidth. Wireshark (registered trademark) captures and saves TCP/IP traffic. Python is used for data aggregation and evaluation based on the Wireshark (registered trademark) capture.

Server 10 may be implemented by a processor and a memory containing predetermined programs, or may be implemented by a dedicated circuit. Server 10 includes a computer.

Client 20 may be implemented by a TV set, a player, a recorder, a smartphone, a tablet computer, or a PC.

As illustrated in (b) of FIG. 1, the timing (time stamp) of the file transmitted from server 10 and the timing of the ACK corresponding to the file and transmitted from client 20 can be obtained.

2-3. Dummynet

Dummynet run by server 10 will now be described.

Dummynet is a network emulation tool. Dummynet simulates queue, bandwidth limitations, delays, and packet loss, and implements various scheduling algorithms. Dummynet runs within any operating system, and works by intercepting selected traffic on its way through the network stack. Dummynet passes packets to pipes which implement a set of queues, a scheduler, a link, and all of configurable features (bandwidth, delay, loss rate, queue size, scheduling policy, etc.). The traffic is selected using the ipfw firewall, which is the main user interface for dummynet. In "Hello world", a pipe is created on all outgoing TCP traffic, and its bandwidth is set to 500 kByte/s. For example, a packet-filtering firewall ipfw (ipfirewall) adds one pipe to the outside of proto tcp. For example, one ipfw pipe has a bandwidth set to 500 kByte/s.

2-4. TCP Header

The TCP header will now be described.

FIG. 2 is a diagram illustrating a configuration of a TCP header.

As illustrated in FIG. 2, the TCP header includes a sequence number and an acknowledgement number.

The sequence number is a pointer to the position of the current payload in the overall transmitted data byte stream. The sequence number is used to sort the received packets into the same order as they were transmitted.

The acknowledgement number indicates that a packet having a specific sequence number has been correctly received. The acknowledgement number includes the next expected sequence number.

From the acknowledgement number (transmitted from the client to the server), server 10 can derive the number of successfully received bytes. Further using the timing of ACK packets, the current throughput can be estimated.

During the three-way handshake, both end-points (i.e., server 10 and client 20) generate random 32-bit integers for their corresponding sequence numbers, and exchange them. As illustrated in the excerpt from the Wireshark (registered trademark) session (FIG. 3), the portions within the boxes indicate the sequence numbers and the acknowledgement numbers. The transmitting end-point increases its sequence number by the number of currently transmitted bytes. The acknowledgement number is used by the client to indicate the number of correctly received bytes.

Figure 4:
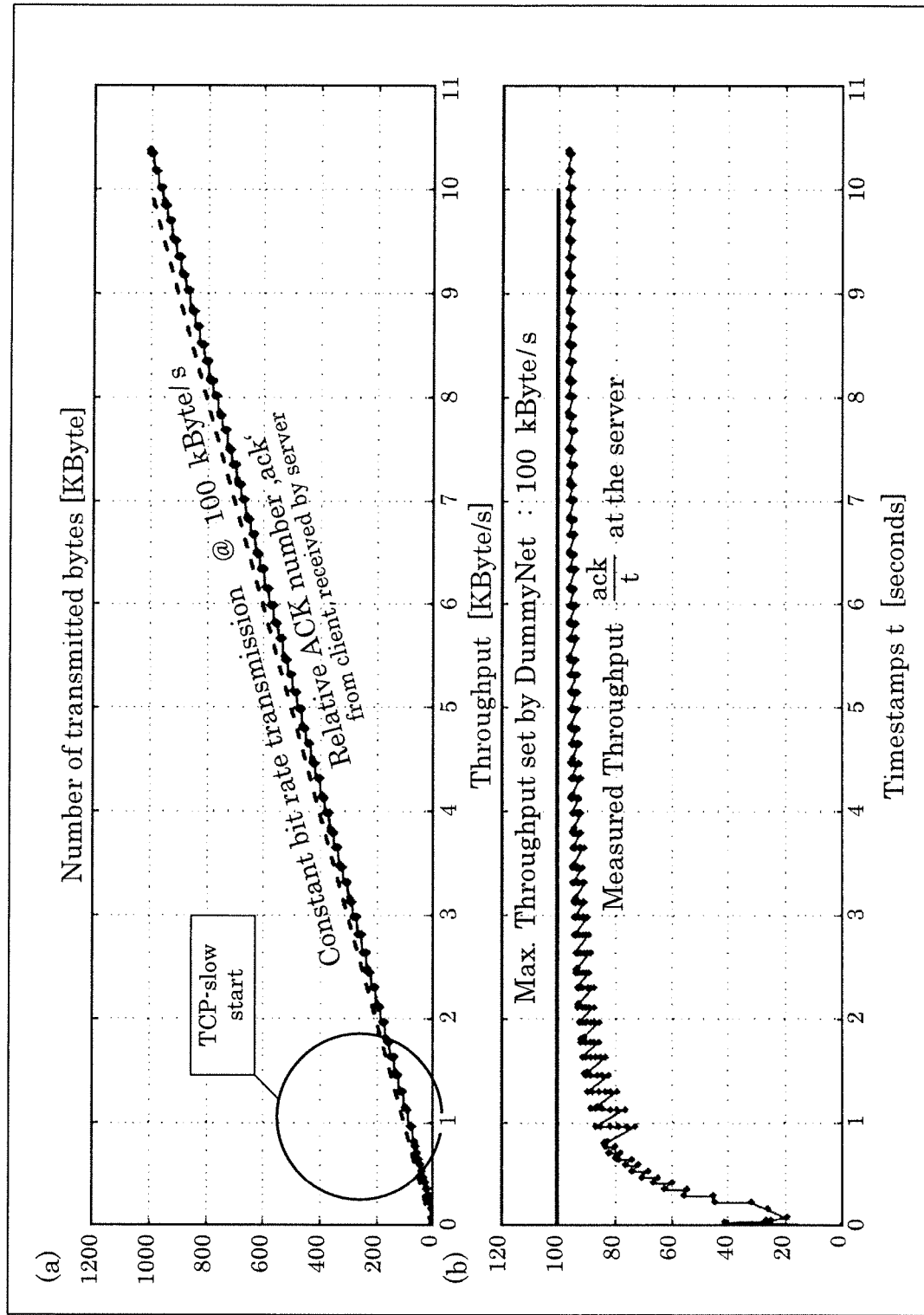
FIG. 4 is a graph illustrating the results of throughput estimation in transmission with a TCP bandwidth of 100 kByte/s.
Figure 5:
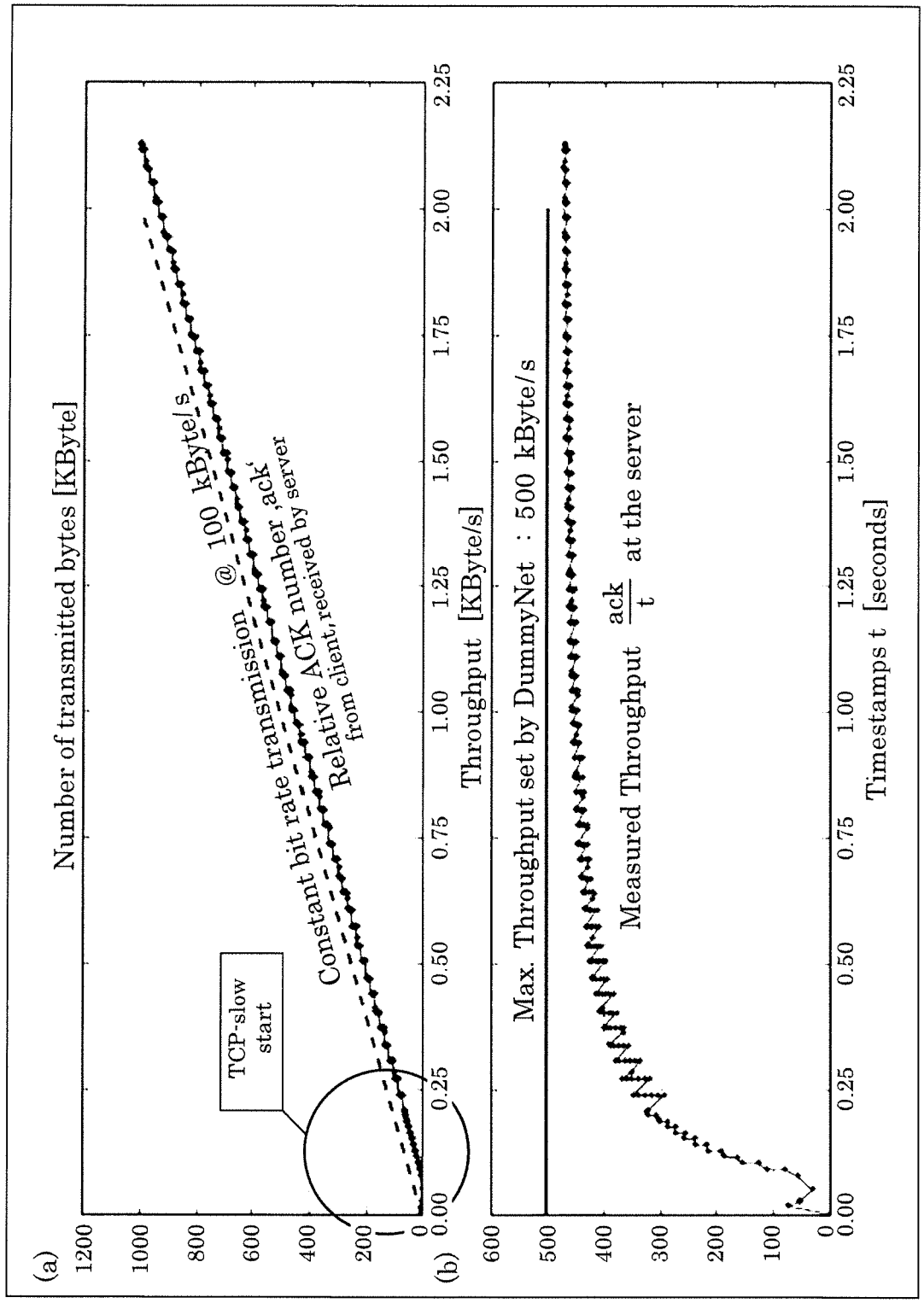
FIG. 5 is a graph illustrating the results of throughput estimation in transmission with a TCP bandwidth of 500 kByte/s.
Figure 6:
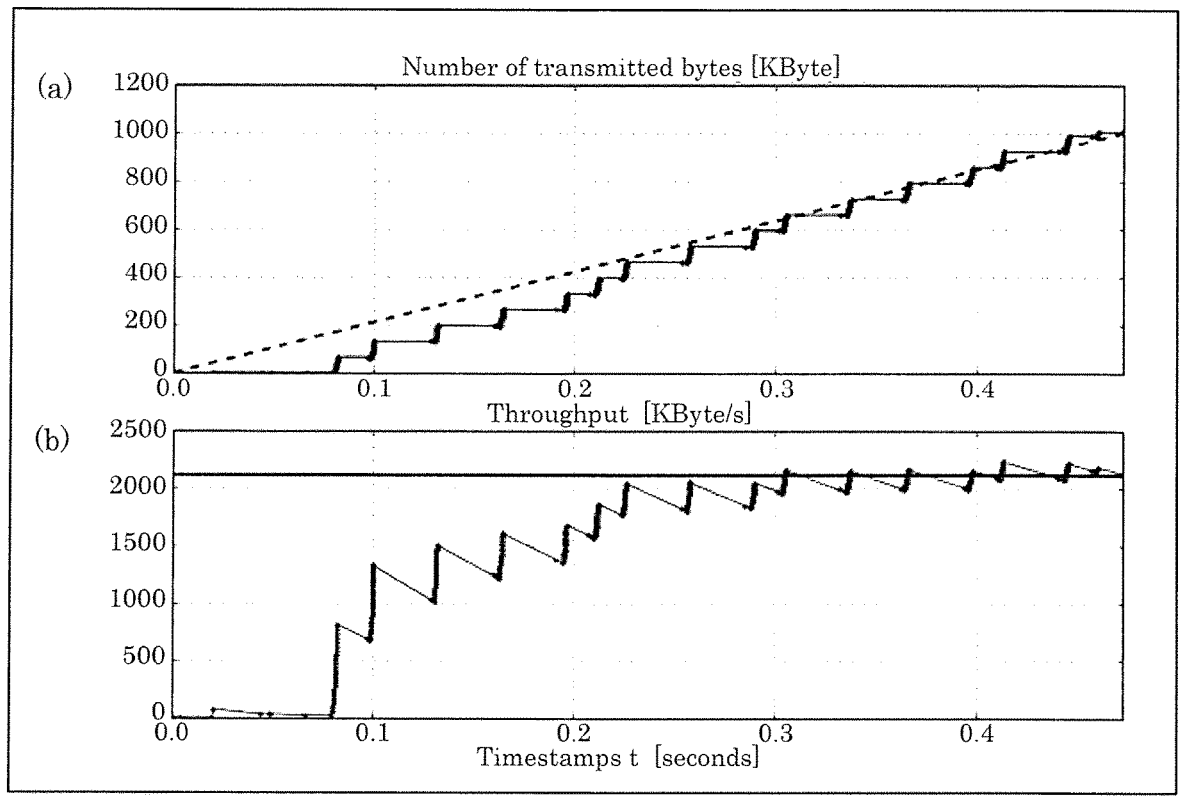
FIG. 6 is a graph illustrating the results of throughput estimation in transmission without limiting the bandwidth.
Figure 7:
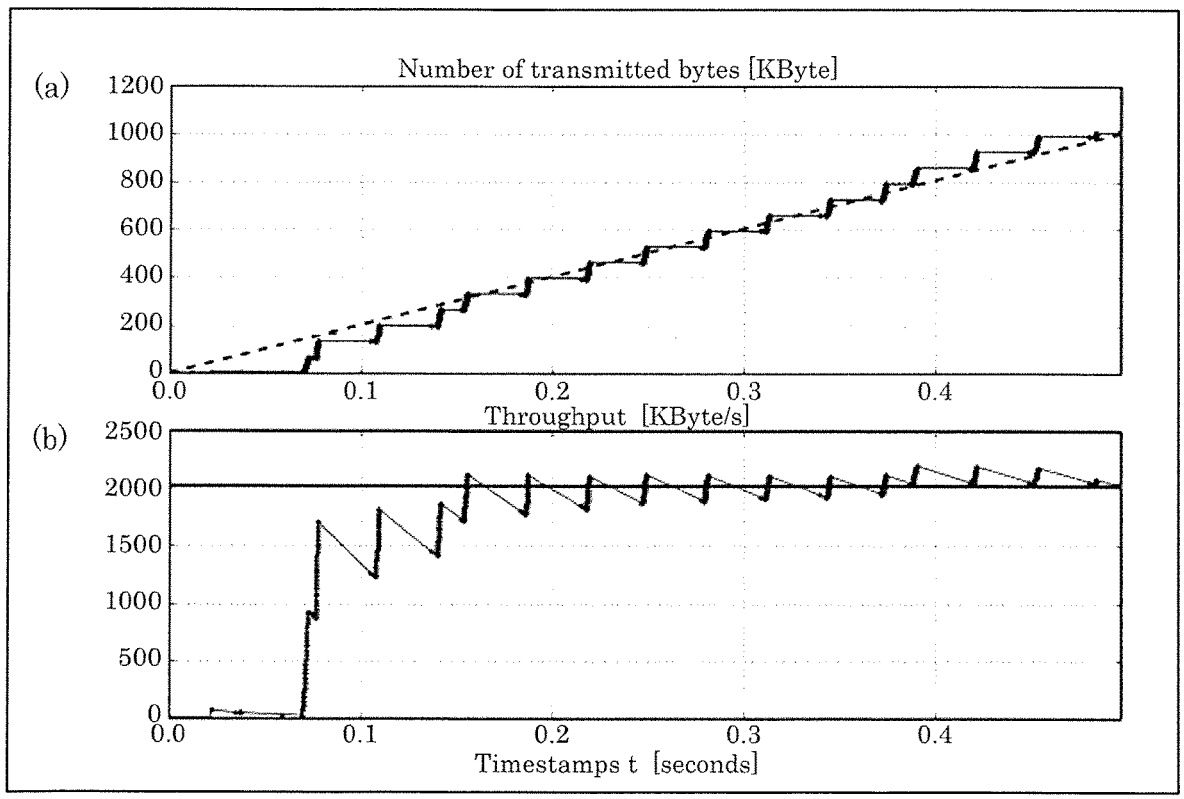
FIG. 7 is a graph illustrating the results of throughput estimation in transmission without limiting the bandwidth.
Figure 8:
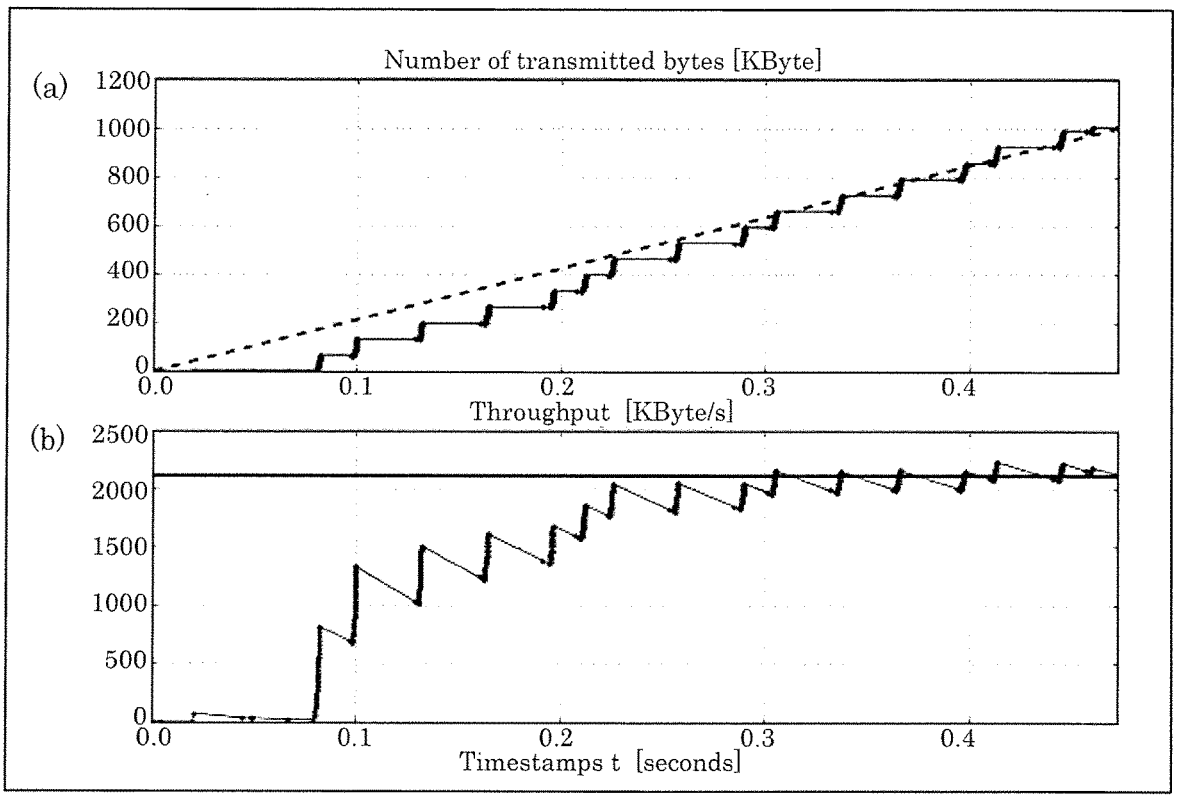
FIG. 8 is a graph illustrating the results of throughput estimation in transmission without limiting the bandwidth.
Figure 9:
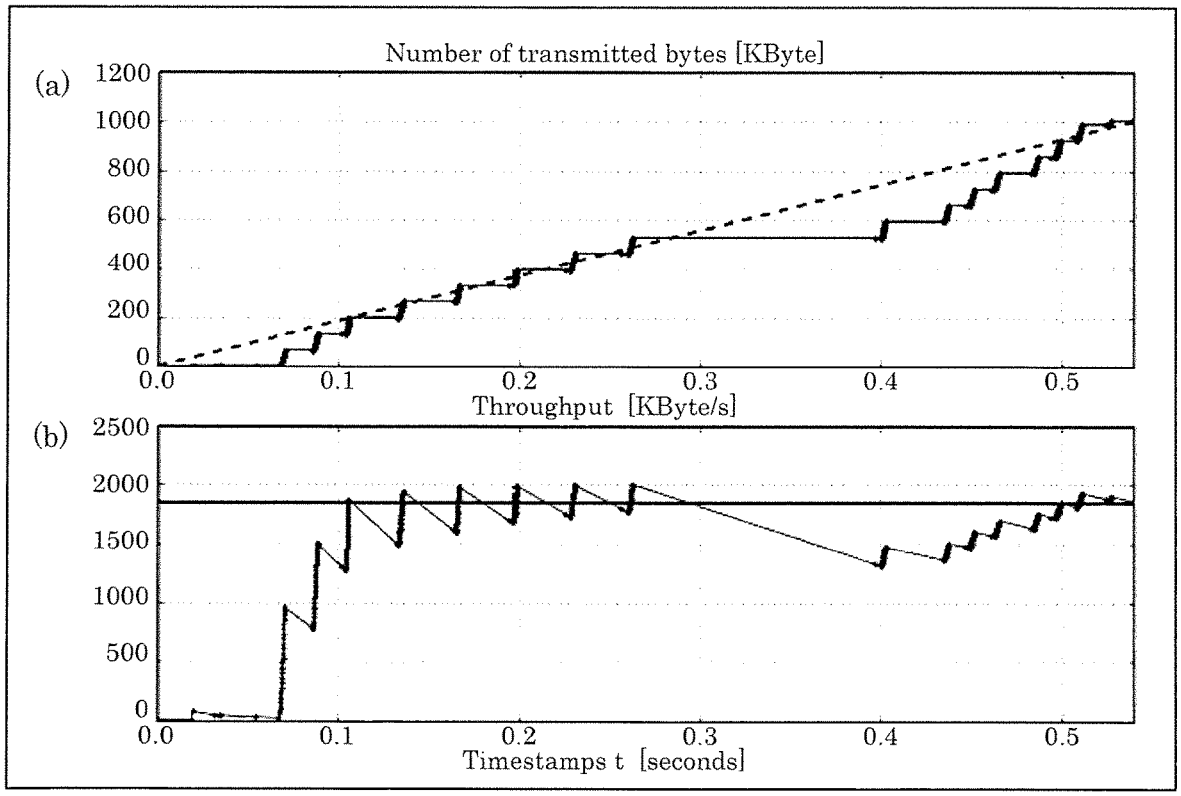
FIG. 9 is a graph illustrating the results of throughput estimation in transmission without limiting the bandwidth.

FIGS. 4 to 9 are graphs illustrating the number of bytes actually transmitted and the results of throughputs estimated by the method. FIG. 4 is a graph illustrating the results of throughput estimation in transmission with a TCP bandwidth of 100 kByte/s. FIG. 5 is a graph illustrating the results of throughput estimation in transmission with a TCP bandwidth of 500 kByte/s. FIGS. 6 to 9 are graphs illustrating the results of throughput estimation in transmission without limiting the bandwidth.

As illustrated in FIGS. 4 to 9, the results of estimation substantially match with the number of bytes actually transmitted, and therefore can be used.

As described above, the throughput measurement on the server side is largely executable.

Thereby, server 10 can mainly manage its resources. Server 10 can more significantly avoid a fluctuation in representations on client 20 side. Client 20 may be dumb, and does not need to track traffic diagnostics. Overhead can be reduced by saving metric/diagnostic messages.

For example, as shown in Table 3, the push directives including push-automatic-rate and push-full-automatic may be used.

TABLE 3

| PushType | PushParams | Description |
| --- | --- | --- |
| push-next | K: Number | Request for pushing the next K segments, using the requested segment as the initial index. A value of 0 means that the server may select to push indefinitely. |
| push-none | N/A | Explicitly signals indicating that no push is present. |
| push-template | S: String | Request for pushing the next segments as described by the URL template S. |

TABLE 3-continued

| PushType | PushParams | Description |
|---|---|---|
| push-time | T: Number | Request for pushing the next segments until the specified segment time (presentation time of the first frame). A segment exceeds time T, beginning with the requested segment. A value of 0 means the server may select to push indefinitely. |
| push-automatic-rate | N/A | Request for pushing the next segments with bit rate selected by a server |
| push-full-automatic | N/A | Request for pushing the next segments selected by a server. That is, numbers or duration to transmit segments and their bit rate, etc. are determined by a server. |

Figure 10:
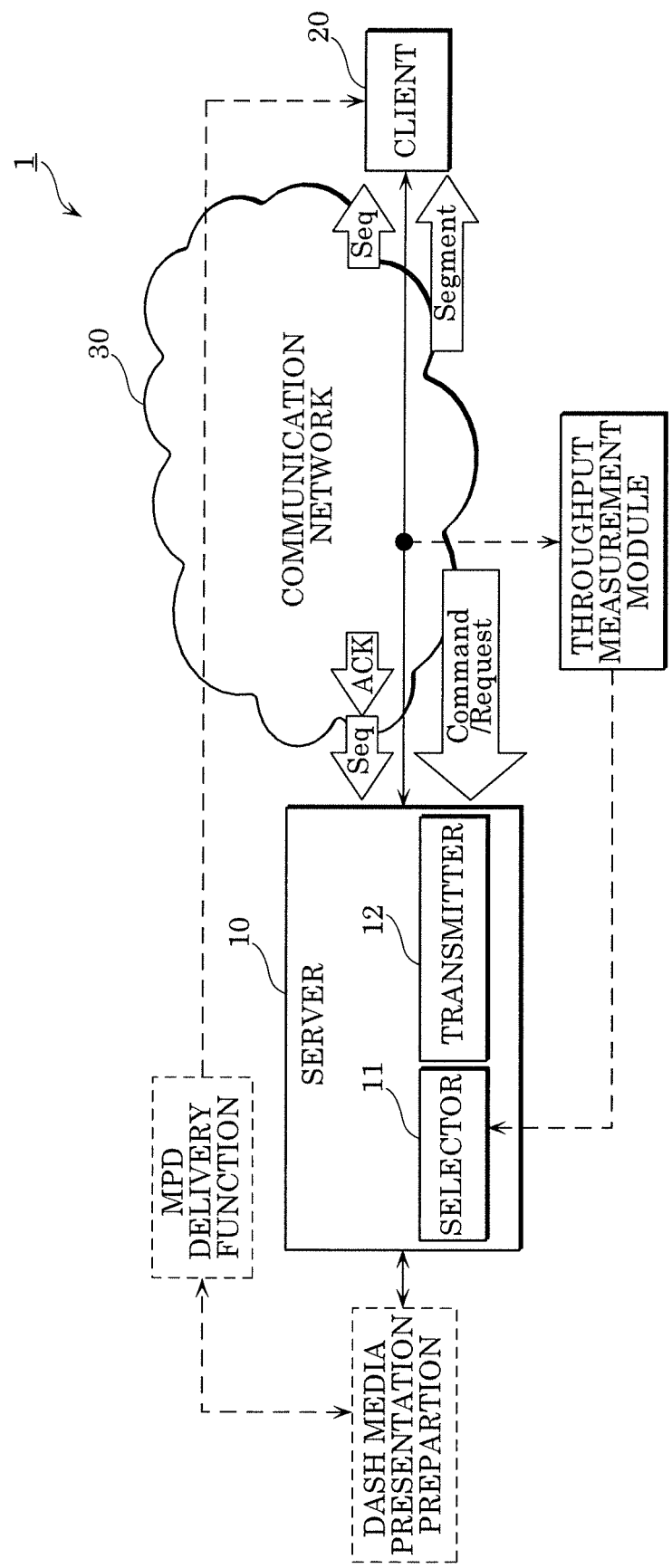
FIG. 10 is a diagram illustrating another example of a detailed configuration of the communication system according to Embodiment 2.

FIG. 10 is a diagram illustrating another example of a detailed configuration of a communication system according to Embodiment 2.

Communication system 1 includes server 10 and client 20. Server 10 is connected to client 20 via communication network 30 to communicate with each other.

Server 10 and client 20 each include a processor, a storage, and a communicator including a transmitter and a receiver.

Figure 11:
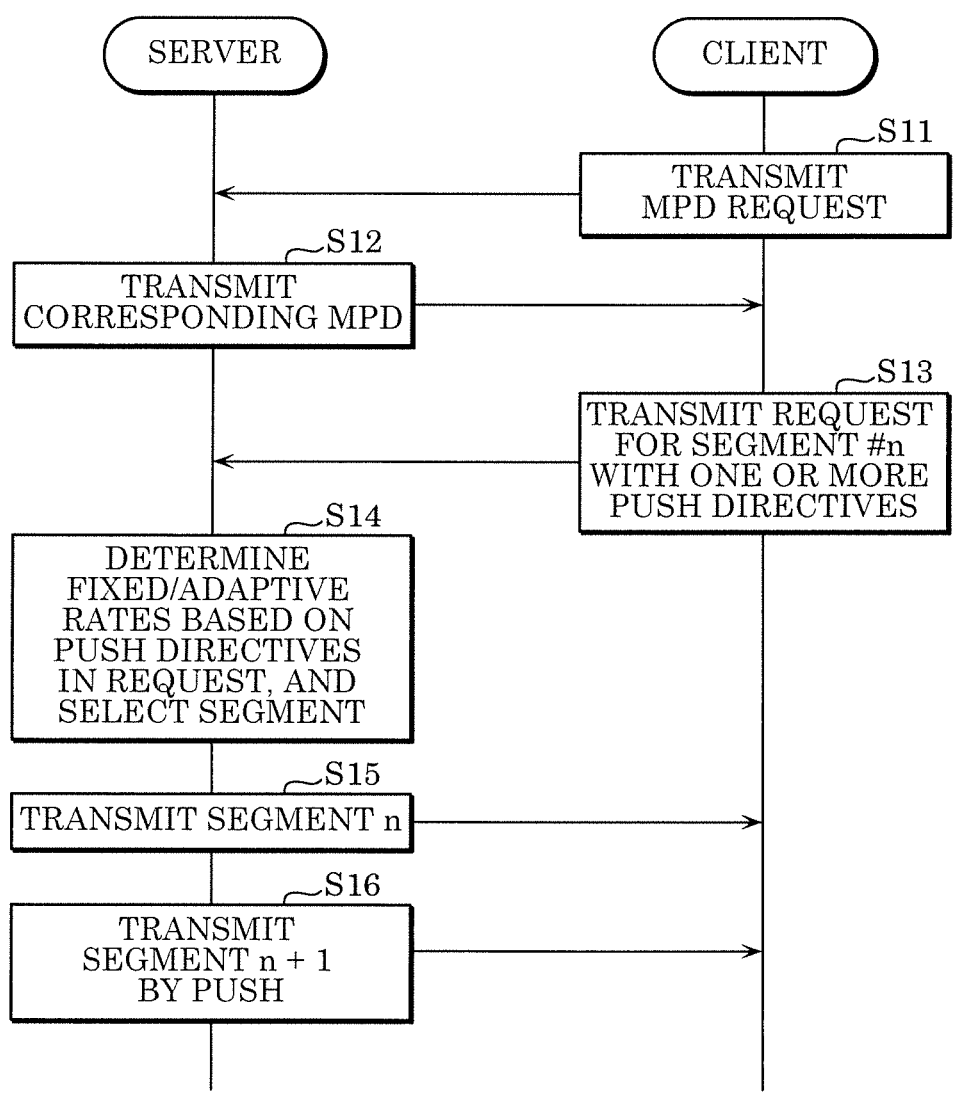
FIG. 11 is a sequence diagram illustrating the operation of a communication system according to a modification.

The processors included in server 10 and client 20 each execute processing illustrated in a sequence diagram (see FIG. 11). The processor uses other units collaborating with server 10 and client 20 or another apparatus. Typically, programs for executing the processing illustrated in the flow are stored in the storages included in server 10 and client 20, respectively.

Server 10 includes selector 11 and transmitter 12.

Details of server 10 and client 20 will be described in the description of the operation of communication system 1.

FIG. 11 is a sequence diagram illustrating one example of the operation of the communication system.

Client 20 first transmits an MPD request indicating an MPD request to server 10 (S11).

In the next step, server 10 receives the MPD request transmitted from client 20, and transmitter 12 in server 10 transmits an MPD corresponding to the received MPD request (corresponding MPD) to client 20 (S12). As described in Embodiment 1, in S12, server 10 may transmit part or all of initialization segments to client 20 by a push, in addition to the MPD corresponding to the received MPD request. Hereinafter, the transmission by the push, in response to the MPD request, of initialization segments or other files such as updated new MPDs in addition to the MPD specified in the MPD request is also referred to as MPD push.

The operation of client 20 when server 10 does not transmit the initialization segments by the push is similar to the communication with a server which does not deal with the push transmission. In other words, among the initialization segments described in the received MPD, client 20 transmits the segment requests specifying necessary initialization segments. Server 10 transmits the initialization segments specified in the received segment requests to client 20.

Client 20 receives the corresponding MPD with one or more push directives, transmits the segment request indicating the request of segment #n to server 10, and measures Ack (S13).

Server 10 receives the segment request for segment #n having a specified push directive. Selector 11 in server 10 determines the fixed rate or the adaptive rate based on the push directive of the received segment, and selects the segment to be transmitted, based on the received segment request for segment #n (S14).

Server 10 transmits segment n specified in the segment request, and sequentially transmits the segments after segment n+1 by a push, the segments being selected by selector 11 (S15 and S16). Hereinafter, the transmission by the push, in response to the segment request, of the segment other than the segment specified in the segment request is also referred to as segment push.

Segment n may be transmitted before the determination of the fixed rate or the adaptive rate. Selector 11 selects the segments after segment n based on the throughput obtained in the measurement using Ack described above. In the case where the push directive specified in the segment request for segment #n is a push directive requiring a push transmission other than push-automatic-rate or push-full-automatic, selector 11 selects the segments after segment n+1 according to the push directive specified in the segment request for segment #n without measuring the throughput.

In FIG. 10, only selector 11 and transmitter 12, which are necessary for transmission of segments with the adaptive rate, are illustrated as the configuration of server 10. Needless to say, however, server 10 includes other components needed for the operation of the DASH server described in NPL 1, for example. For example, server 10 includes a receiver which receives messages such as MPD requests and segment requests transmitted from client 20, and a processor which interprets DASH commands contained in the received messages or generates messages to be transmitted to client 20 as replies to the messages such as the MPD requests or segment requests.

FIG. 10 illustrates an example in which the MPD delivery function is disposed external to server 10. This indicates that an MPD may be transmitted to client 20 from a communication apparatus different from server 10. It should be noted that server 10 has MPD delivery function in the case where server 10 transmits an MPD to client 20 in response to the MPD request transmitted from client 20, as described in FIG. 11.

Although FIG. 10 illustrates an example in which the throughput measurement module is disposed external to server 10, server 10 may include the throughput measurement module.

The throughput measurement module illustrated in FIG. 10 is not always needed in the case where server 10 does not correspond to the push directive which controls the bit rate on the server side (e.g., push-automatic-rate or push-full-automatic described above). In such a case, selector 11 in server 10 selects the segment to be transmitted by a push, based on the push directive which is added to the segment request received from client 20 and is other than the push directive which controls the bit rate on the server side (such as push-next, push-template, or push-time). In the case where push-none is specified, to server 10, client 20 transmits a segment request specifying a segment needed for playback, and obtains the segment.

A detailed configuration of client 20 is not disclosed in FIG. 10. Needless to say, client 20 includes other components needed for the operation of the DASH client described in NPL 1, for example. For example, client 20 includes a transmitter which transmits messages such as MPD requests, segment requests, and Ack to server 10 or another communication apparatus, or a receiver which receives messages including MPDs, segments, and DASH commands from server 10 or another communication apparatus. Client 20 further includes a DASH accessing unit which interprets DASH commands contained in the received messages and generates DASH commands to be transmitted to server 10 or another communication apparatus, such as MPD requests and segment requests. Client 20 may also include a decoder which decodes the media data obtained in the DASH accessing unit, and displays the decoded audio signals and/or video signals on an internal display unit of the client or an external display unit having wired or wireless connection to the client. The aforementioned display unit is a display or a speaker, for example. Client 20 may include an application unit which executes event data obtained in the DASH accessing unit.

3. Modifications

A following modification is applicable to the embodiments described above.

3-1. Modification 1

Although an example has been described in the embodiments above by way of an example in which push-automatic-rate or push-full-automatic is specified as a new push strategy which can be specified as "pushType" parallel to push-next or push-none, push-automatic-rate or push-full-automatic may be specified in any other format.

For example, push-automatic-rate or push-full-automatic may be defined as a parameter parallel to (written down along with) "K:Number", which is a parameter (PUSH_PARAMS) specified when push-next is selected in PushType. In this case, multiple parameters are written down along with PUSH_PARAMS in push directive or PushAck. Similarly, the specification of whether it is "automatic" or not or the specification of the mode of "automatic" is also enabled in PUSH_PARAMS when push-template or push type is selected as PushType.

Alternatively, push-automatic-rate or push-full-automatic may be defined, for example, as a parameter parallel to (written down along with) PUSH_TYPE in the push directive. In this case, separated from PUSH_TYPE, a region specifying whether it is "automatic" or specifying the mode of "automatic" is disposed in the format of the push directive.

3-2. Modification 2

A following modification is applicable to the embodiments described above. It should be noted that the following configuration may be used not in combination with the above-described embodiments (for example, the specification of "automatic" in segment push). Such a treatment of "automatic" as an independent attribute enables the specification of whether server 10 can automatically determine not only the number and duration of segments transmitted from server 10 and their bit rate but also other parameters.

For example, in the case where MPD push is specified using a push directive (or another Data Type) in an MPD request, any one of the following configurations or any combination thereof may be used.

(1)
When execution of MPD push is specified using a push directive in an MPD request, server 10 may transmit a new MPD by a push in response to the updated MPD.

(2)
When the execution of MPD push is specified using the push directive in an MPD request, server 10 may transmit, by a push, metadata associated with the decode or display of the media data in addition to the specified MPD. Here, one example of the metadata is the header information (i.e., initialization segment) of MP4 when the media data is MP4. The metadata stores access information to coded data of sounds and/or pictures and PTS/DTS, for example. In other words, server 10 may transmit initialization segments with MPDs to client 20. In this case, transmission or non-transmission of the metadata by the push may be specified by the push directive in the MPD request.

(3)
The duration or number of MPDs (or metadata) transmitted by a push by server 10 may be specified by the push type, for example. In other words, server 10 may transmit, by the push, the duration or number of MPDs (and metadata) specified by the push type.

(4)
In the case where the MPD push is specified, server 10 may perform the preliminarily defined operation (default operation), and the push directive in the MPD request may only specify whether the MPD push is executed or not. It should be noted that stop (not executing) of the MPD push may be specified from client 20 or server 10.

Needless to say, in the case where client 20 transmits an MPD request specifying a push directive requesting MPD push and server 10 is specified not to execute MPD push, the subsequent operation of client 20 is similar to the operation of the client not corresponding to the MPD push. In other words, client 20 obtains the initialization segments needed to play back desired media by transmitting a segment request to server 10.

By allowing the specification of not executing MPD push by server 10 as described above, non-execution of push transmission of initialization segments by server 10 can be determined, and client 20 requiring the push transmission of the initialization segments can be notified about such a determination. Such a configuration enhances the freedom in control in server 10.

(5)
Unlike the case of the segment push, for example, all of the initialization segments can be transmitted in the MPD push. For this reason, there are possibilities that server 10 or client 20 does not need to select any one of corresponding segments (such as segments having different bit rates). In such a case where the push strategy which can be selected in the MPD push is different from the push strategy which can be selected in the segment push, "MPD push Directive" for specifying the push strategy in the MPD request may be defined separately from "Segment push Directive" for specifying the push strategy in the segment request. Alternatively, the push directives in the same format may be used in the MPD request and the segment request, and the parameters which can be used in the MPD request may be limited. For example, the parameters which can be used in the MPD request are limited by prohibiting the use of automatic.

(6)
The push strategy of the media segment may be specified in the push directive of an MPD request.

For example, the push strategy of the MPD push and the push strategy of the segment may be separately specified in the MPD request.

For example, when the push strategy of the media segment is specified in the MPD request, the push strategy (including push-none) of the MPD push corresponding to the push strategy of the specified segment may be automatically selected and generated.

For example, when the push strategy of the MPD push is specified in the MPD request, the push strategy (including push-none) of the segment corresponding to the push strategy of the specified MPD push may be automatically selected or generated.

4. Supplement: Client and Server

The client and the server which enable the specification of automatic with the push directive have been described with reference to FIGS. 10 and 11. One example of a configuration including a client as a receiving apparatus which receives streaming data according to the MPEG-DASH standard and a server as a transmitting apparatus which transmits the streaming data in the case of the push directive described in the above modification but not using automatic will now be described.

Figure 12:
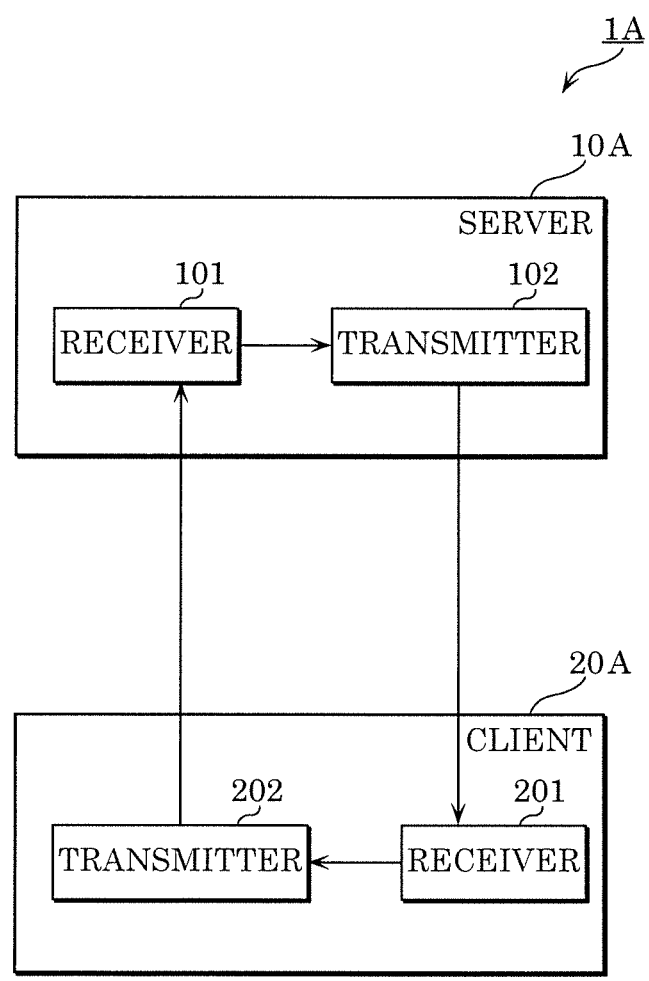
FIG. 12 is a diagram illustrating another example of a specific configuration of the communication system.

FIG. 12 is a diagram illustrating another example of the configuration of the communication system.

Server 10A and client 20A include a processor, a storage, and a communicator including a transmitter and a receiver as described in FIG. 10.

Communication system 1A is configured with server 10A and client 20A connected to communicate with each other via a communication network not illustrated.

Server 10A includes receiver 101 and transmitter 102. Receiver 101 and transmitter 102 are each implemented with a microcomputer, a processor, or a dedicated circuit, for example. Although not illustrated in FIG. 12, server 10A may include a selector and/or a processor similarly to server 10 in FIG. 10.

The following functions of server 10A:
(1) transmission of MPDs
(2) transmission of the segment, and
(3) interpretation of the received DASH commands and transmission of DASH commands to client 20A
may be implemented in an identical server. Alternatively, each of multiple servers may implement at least one of the functions to provide these functions to client 20A as an integrated operation by the multiple servers.

Client 20A includes receiver 201 and transmitter 202. Receiver 202 and transmitter 202 are each implemented with a microcomputer, a processor, or a dedicated circuit, for example. Although not illustrated in FIG. 12, client 20A may include a DASH accessing unit, a decoder, or an application unit similarly to client 20 in FIG. 10.

The operations executed by the components of server 10A and those of client 20A will be described in the description of a transmission method and a reception method.

One example of the transmission method and the reception method executed by server 10A and client 20A will be described with reference to FIG. 13.

Figure 13:
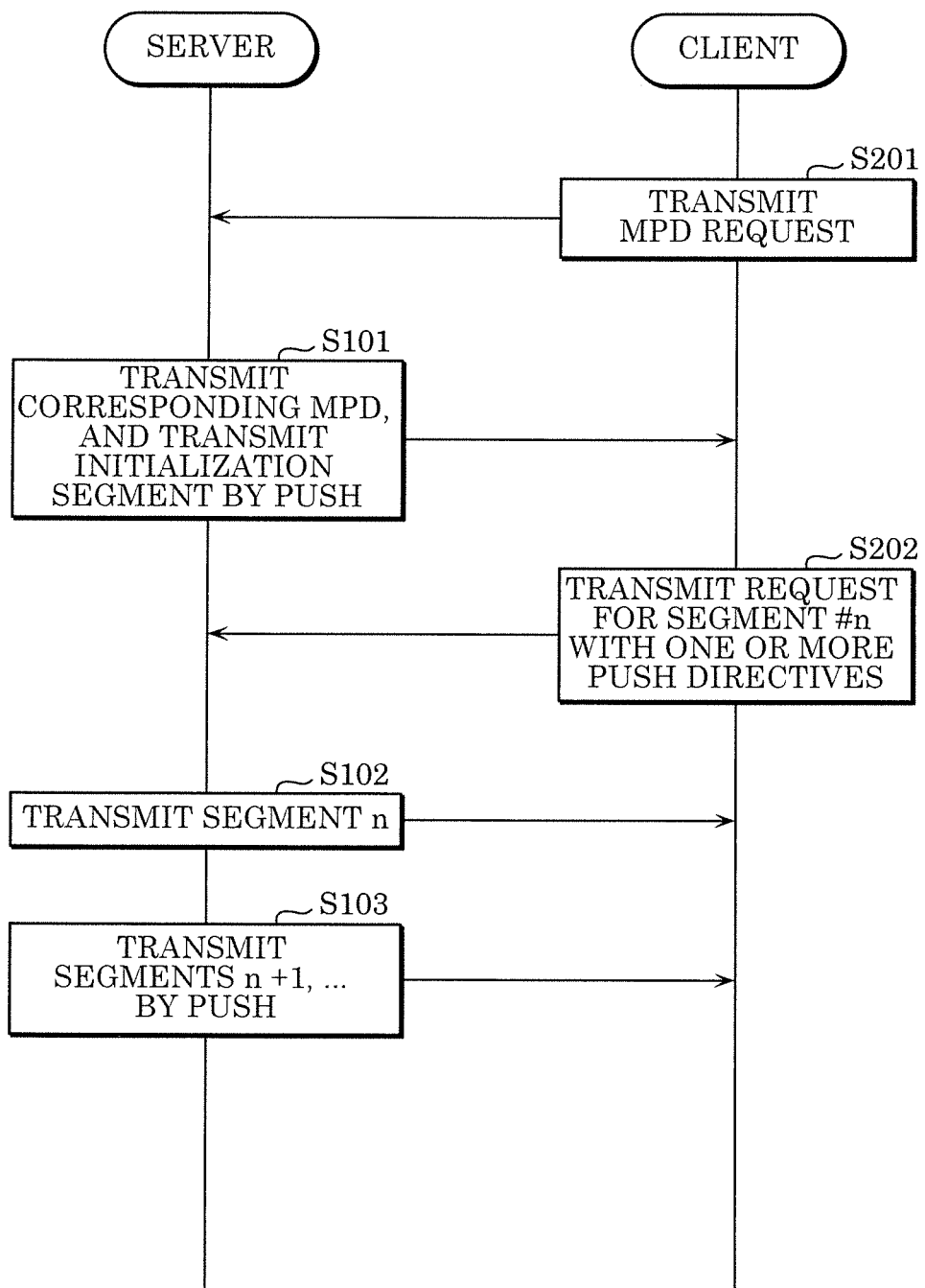
FIG. 13 is a sequence diagram for illustrating the operation of a communication system including a transmission method by a server and a reception method by a client.

FIG. 13 is a sequence diagram for illustrating the operation of the communication system including the transmission method by the server and the reception method by the client.

The operation (reception method) of client 20A will be described.

Transmitter 202 in client 20A transmits an MPD request specifying a necessary MPD to the server with one or more push directives (S201). Besides the MPD specified in the MPD request, a push directive requesting the transmission by a push of the initialization segment, which is referred by the MPD, is set in the MPD request transmitted by client 20A.

Receiver 201 in client 20A receives the MPD specified in the MPD request and the initialization segment transmitted by the push.

Transmitter 202 in client 20A then transmits a segment request specifying segment n with one or more push directives (S202).

The operation (transmission method) of server 10A will be described.

From client 20A, receiver 101 in server 10A receives the MPD request specifying the MPD with one or more push directives, the MPD request having been transmitted in Step S201.

Transmitter 102 in server 10A transmits the MPD specified in the MPD request, which is received by receiver 101, and the initialization segment to client 20A (S101).

Receiver 101 in server 10A receives the one or more push directives and the segment request specifying segment n, which are transmitted in Step S202.

Transmitter 102 in server 10A transmits segment n specified in the segment request to client 20A (S102).

Similarly, transmitter 102 in server 10A transmits the segments after segment n+1 to client 20A by a push (S103).

Because client 20A transmits the MPD request with the push directive indicating the initialization segment request to server 10A as described above, one step of the processing can be reduced compared to the case of a conventional method of separately transmitting an MPD request and an initialization segment request in which after the transmission of the MPD request and then the reception of the MPD, a segment request specifying an initialization segment is transmitted, and then the initialization segment is received. For this reason, the amount of processing can be effectively reduced.

In each of the embodiments above, the components may each be configured with dedicated hardware, or may be implemented by executing software programs suitable for the components. The components may each be implemented by a program executor (such as a CPU or a processor) reading and executing the software programs recorded in a recording medium (such as a hard disk or a semiconductor memory). Here, the reception method and the transmission method in these embodiments are implemented with the following software, for example.

That is, the program causes a computer to execute a reception method in a client which receives streaming data according to the MPEG-DASH standard. In the reception method, the client transmits an MPD request or a segment request to a server, and receives an MPD specified in the MPD request and a segment specified in the segment request. The MPD request contains information requesting transmission of an initialization segment by a push. In the reception, the client receives the initialization segment transmitted by the push.

The program causes a computer to execute a transmission method in a server which transmits streaming data according to the MPEG-DASH standard. In the transmission method, the server receives an MPD request or a segment request from a client, and transmits an MPD specified in the received MPD request and a segment specified in the received segment request to the client by a push. The MPD request contains information requesting transmission of an initialization segment by the push. In the transmission, the server transmits the initialization segment by the push.

Although the clients, servers, reception methods, and transmission methods according to one or more aspects of the present disclosure have been described above based on the embodiments, the present disclosure will not be limited by these embodiments. A variety of modifications conceived by persons skilled in the art and applied to the present embodiments without departing the gist of the present disclosure, and embodiments including combinations of components according to different embodiments may also be included within the scope of one or more aspects of the present disclosure.

INDUSTRIAL APPLICABILITY

The present disclosure is applicable to apparatuses or equipment in transmission or reception of streaming data according to the MPEG-DASH standard.

REFERENCE MARKS IN THE DRAWINGS 1 communication system
10, 10A server
11 selector
12 transmitter
20, 20A client
30 communication network
101 receiver
102 transmitter
201 receiver
202 transmitter

What is claimed is:

1. A client complied to Moving Picture Experts Group-Dynamic Adaptive Streaming over HTTP (MPEG-DASH) standard, the client comprising:
communication circuitry configured to communicate with a server; and
a processor coupled to the communication circuitry and configured to control the communication circuitry to:
transmit, to the server, a Media Presentation Description (MPD) request including a first push directive having a first push type;
receive, from the server, an MPD specified by the MPD request and only a part of initialization segments not specified by the first push directive, each initialization segment including meta data for a media content, each initialization segment being not a media segment of the media content; and
transmit, to the server, a segment request including a second push directive, the second push directive having a second push type different from the first push type, the segment request being generated by reference to the MPD.

2. A server complied to Moving Picture Experts Group-Dynamic Adaptive Streaming over HTTP (MPEG-DASH) standard, the server comprising:
communication circuitry configured to communicate with a client; and
a processor coupled to the communication circuitry and configured to control the communication circuitry to:
receive, from the client, a Media Presentation Description (MPD) request including a first push directive having a first push type;
transmit, to the client, an MPD specified by the MPD request and only a part of initialization segments not specified by the first push directive, each initialization segment including meta data for a media content, each initialization segment being not a media segment of the media content; and
receive, from the client, a segment request including a second push directive, the second push directive having a second push type different from the first push type, the segment request being generated in the client by reference to the MPD.

* * * * *